(12) United States Patent
Moriya

(10) Patent No.: US 8,025,043 B2
(45) Date of Patent: Sep. 27, 2011

(54) CONTROLLER FOR INTERNAL COMBUSTION ENGINE

(75) Inventor: Yoshihito Moriya, Nagoya (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 149 days.

(21) Appl. No.: 12/367,753

(22) Filed: Feb. 9, 2009

(65) Prior Publication Data

US 2009/0204312 A1  Aug. 13, 2009

(30) Foreign Application Priority Data

Feb. 8, 2008  (JP) .................................. 2008-028957

(51) Int. Cl.
*F02D 7/00*  (2006.01)
(52) U.S. Cl. ........................................ 123/481; 123/347
(58) Field of Classification Search ............... 123/198 F, 123/321, 345–348, 481
See application file for complete search history.

(56) References Cited

U.S. PATENT DOCUMENTS

| 7,469,672 | B2 * | 12/2008 | Andri | 123/198 F |
| 7,487,852 | B2 * | 2/2009 | Leone et al. | 180/65.28 |
| 7,497,198 | B2 * | 3/2009 | Leone et al. | 123/295 |
| 7,694,760 | B2 * | 4/2010 | Leone et al. | 180/65.21 |

FOREIGN PATENT DOCUMENTS

| JP | 04019334 | 1/1992 |
| JP | 05163971 | 6/1993 |
| JP | 06193478 | 7/1994 |
| JP | 06207541 | 7/1994 |
| JP | 10169479 | 6/1998 |
| JP | 2002221052 | 8/2002 |
| JP | 2005002934 | 1/2005 |
| JP | 2007046500 | 2/2007 |

* cited by examiner

*Primary Examiner* — John T Kwon
(74) *Attorney, Agent, or Firm* — Gifford, Krass, Sprinkle, Anderson & Citkowski, P.C.

(57) ABSTRACT

The engine operational region in which the cylinder deactivation operation is performed in the cylinder deactivation control is switched between the cylinder deactivation region AP1 and the cylinder deactivation region AP2 depending on whether a variable valve timing mechanism is in an operation allowed state and control of the valve timing of an intake valve is being performed, or the variable valve timing mechanism is in an operation inhibited state and the control of the valve timing of the intake valve is stopped. In this way, depending on whether the variable valve timing mechanism is in the operation allowed state or in the operation inhibited state, the engine operational region in which the cylinder deactivation operation is performed can be set so that the engine operational region is made suitable for each of these state.

13 Claims, 4 Drawing Sheets

CONTROLLER FOR INTERNAL COMBUSTION ENGINE

INCORPORATION BY REFERENCE

The disclosure of Japanese Patent Application No. 2008-028957 filed on Feb. 8, 2008 including the specification, drawings and abstract is incorporated herein by reference in its entirety.

BACKGROUND OF THE INVENTION

1. Field of the Invention

The invention relates to a controller for an internal combustion engine.

2. Description of the Related Art

An internal combustion engine mounted on a vehicle, such as an automobile, has been available that performs cylinder deactivation control in which switching between all cylinder operation and cylinder deactivation operation is performed according to operating conditions of the engine. In the all cylinder operation, all the cylinders are operated, and in the cylinder deactivation operation, operation of part of the cylinders is stopped.

In Japanese Patent Application Publication No. 5-163971 (JP-A-5-163971) (in particular, paragraphs [0035] and [0036], FIG. 3), in such cylinder deactivation control, the all cylinder operation is performed when the engine is in high load operation, and the cylinder deactivation operation is performed when the engine is in low load operation. This is because in an internal combustion engine, there is a tendency that the fuel economy is good when the engine is in high load operation, that is, when an operation is performed in which the amount of aft (mixture) taken into the operating cylinder per cycle is large, and it is intended to improve the fuel economy of the engine in consideration of such fuel economy characteristics of the internal combustion engine.

When the engine is in low load operation in which the fuel economy of the internal combustion engine is not good, that is, there is a fear that the amount of air (mixture) taken into the operating cylinder per cycle falls short, the operation of part of the cylinders is stopped by the cylinder deactivation operation, so that the amount of air (mixture) taken into the remaining operating cylinders per cycle is increased. As a result, the amount of air (the amount of mixture) taken into the operating cylinder per cycle in the cylinder deactivation operation becomes closer to the amount of air (the amount of mixture) taken into the operating cylinder per cycle when the engine is in high load operation in the all cylinder operation. Thus, the fuel economy of the internal combustion engine when the engine is in low load operation is improved.

In order to improve the fuel economy of the internal combustion engine, it is preferable that the engine operational region in which the cylinder deactivation operation is performed in the cylinder deactivation control be maximally broadened. However, if the engine operational region in which the cylinder deactivation operation is performed is excessively broadened, depending on the engine operating conditions, combustion conditions can be deteriorated in the operating cylinder that is operating in the cylinder deactivation operation. If the engine operational region in which the cylinder deactivation operation is performed is excessively broadened to the high load side, for example, combustion conditions in the operating cylinder that is operating in the cylinder deactivation operation are deteriorated when the engine operating conditions are in a high load side of such an engine operational region. It is presumed that such deterioration in the combustion conditions in the operating cylinder occurs because the amount of air taken into the operating cylinder per cycle exceeds the amount of air that can be actually taken in when the cylinder deactivation operation is performed under above-described conditions, which influences the combustion of the mixture.

Thus, in the cylinder deactivation control, the engine operational region in which the cylinder deactivation operation is performed is determined in consideration of the above-described circumstances, the cylinder deactivation operation is performed only in the thus determined region, and the all cylinder operation is performed in other region. Thus, the fuel economy is maximally improved by the cylinder deactivation operation, and the deterioration of the combustion conditions caused by performing the cylinder deactivation operation in an inappropriate engine operational region is suppressed.

Meanwhile, some internal combustion engines mounted on vehicles are provided with a variable valve timing mechanism that continuously varies the open/close characteristics of the engine valves, such as intake valves and exhaust valves. In the internal combustion engine provided with such a variable valve timing mechanism, the variable valve timing mechanism is switched between the operation allowed state and the operation inhibited state according to the engine operating conditions. When the variable valve timing mechanism is in the operation allowed state, an operation command value of the variable valve timing mechanism is calculated based on the engine operating conditions, and by operating the variable valve timing mechanism based on the operation command value, the open/close characteristics of the engine valves are made suitable for the current engine operating conditions. On the other hand, when the variable valve timing mechanism is in the operation inhibited state, the variable valve timing mechanism is controlled so that the open/close characteristics of the engine valves are fixed to be the predetermined characteristics.

When an internal combustion engine in which the cylinder deactivation control is performed is provided with the variable valve timing mechanism, if the engine operational region in which the cylinder deactivation operation is performed in the cylinder deactivation control is determined without taking account of the control of engine-valve open/close characteristics that is performed by the variable valve timing mechanism, there is a fear that the following problem concerning the fuel economy and the combustion conditions of the internal combustion engine occurs.

When the variable valve timing mechanism is in the operation allowed state and the engine-valve open/close characteristics are controlled so as to be suitable for the current engine operating conditions, the combustion conditions are kept in good conditions, and it is therefore possible to perform the cylinder deactivation operation in the cylinder deactivation control in a broad engine operational region. When the engine operational region is determined without taking account of such a thing, however, there is a fear that the determined engine operational region is too narrow. In this case, despite the fact that the engine is in operating conditions in which it is possible to perform the cylinder deactivation operation while keeping the combustion conditions at allowable levels, the cylinder deactivation operation is not performed even when the engine is in such operating conditions, which can accordingly reduce the degree of improvement of the fuel economy of the internal combustion engine.

When the variable valve timing mechanism is in the operation inhibited state and the engine-valve open/close characteristics are fixed to be the predetermined characteristics, the engine-valve open/close characteristics are not always suitable for the engine operating characteristics and it cannot be said that the combustion conditions under such a situation is kept in good conditions. For this reason, it becomes difficult to perform the cylinder deactivation operation in the cylinder deactivation control in a broad engine operational region. When the engine operational region is determined without taking account of such a thing, there is a fear that the determined engine operational region becomes excessively broad. In this case, a situation occurs in which the cylinder deactivation operation is performed despite the fact that the engine operating conditions are such that combustion conditions are deteriorated by performing the cylinder deactivation operation, and combustion conditions are therefore deteriorated.

SUMMARY OF THE INVENTION

The invention provides a controller for an internal combustion engine with which it is possible to perform cylinder deactivation operation in a maximally broad engine operational region to improve the fuel economy, and suppress deterioration of combustion conditions caused by performing the cylinder deactivation operation, regardless of whether the variable valve timing mechanism is in an operation allowed state or in an operation inhibited state.

A first aspect of the invention is a controller for an internal combustion engine in which open/close characteristics of an engine valve of each of cylinders are continuously varied by operation of a variable valve timing mechanism so that the open/close characteristics are made suitable for engine operating conditions, and in which cylinder deactivation control is performed that switches, according to the engine operating conditions, the internal combustion engine between all cylinder operation, in which all of the cylinders are operated, and cylinder deactivation operation, in which operation of part of the cylinders is stopped, which controller switches the variable valve timing mechanism between an operation allowed state and an operation inhibited state while the cylinder deactivation control is performed. In this controller, an engine operational region in which the cylinder deactivation operation is performed in the cylinder deactivation control is a region that is determined provided that the open/close characteristics of the engine valve are varied so that the open/close characteristics are made suitable for the engine operating conditions when the variable valve timing mechanism is in an operation allowed state, or a region that is determined provided that the open/close characteristics of the engine valve are fixed when the variable valve timing mechanism is in an operation inhibited state.

A second aspect of the invention is a controller for an internal combustion engine that includes a variable valve timing mechanism that continuously varies open/close characteristics of an engine valve of each of cylinders, and in which cylinder deactivation control is performed that switches, according to engine operating conditions, the internal combustion engine between all cylinder operation, in which all of the cylinders are operated, and cylinder deactivation operation, in which operation of part of the cylinders is stopped, which controller switches the variable valve timing mechanism between an operation allowed state and an operation inhibited state while the cylinder deactivation control is performed, wherein an engine operational region in which the cylinder deactivation operation is performed in the cylinder deactivation control is changed depending on whether the variable valve timing mechanism is in the operation allowed state or in the operation inhibited state.

According to the above configuration, depending on whether the variable valve timing mechanism is in the operation allowed state or in the operation inhibited state, the engine operational region in which the cylinder deactivation operation is performed in the cylinder deactivation control can be set so that the engine operational region is made suitable for each of these state. Thus, regardless of whether the variable valve timing mechanism is in the operation allowed state or in the operation inhibited state, the engine operational region in which the cylinder deactivation operation is performed is made to have appropriate size. As a result, it is possible to improve the fuel economy by performing the cylinder deactivation operation in a maximally broad engine operational region. In addition, it is possible to suppress the deterioration in combustion conditions caused by performing the cylinder deactivation operation due to excessively broad engine operational region.

In the above aspects, the engine operational region in which the cylinder deactivation operation is performed in the cylinder deactivation control may be narrower when the variable valve timing mechanism is in the operation inhibited state as compared to when the variable valve timing mechanism is in the operation allowed state.

When the variable valve timing mechanism is in the operation allowed state and the open/close characteristics of the engine valves are controlled through the operation of the variable valve timing mechanism so as to be made suitable for the current engine operating conditions, the combustion conditions are thus kept in good conditions, and it is therefore possible to perform the cylinder deactivation operation in the cylinder deactivation control in a broad engine operational region. On the other hand, when the variable valve timing mechanism is in the operation inhibited state and the open/close characteristics of the engine valves are fixed, the open/close characteristics of the engine valves are not always suitable for the current engine operating conditions. Thus, it cannot be said that the current combustion conditions are kept in good conditions, and it is therefore difficult to perform the cylinder deactivation operation in the cylinder deactivation control in a broad engine operational region.

According to the above configuration, the engine operational region in which the cylinder deactivation operation is performed in the cylinder deactivation control is narrowed when the variable valve timing mechanism is in the operation inhibited state as compared to when the variable valve timing mechanism is in the operation allowed state. Thus, it is possible to maximally broaden the engine operational region under the conditions where the variable valve timing mechanism is in the operation allowed state, and at the same time, it is possible to appropriately prevent the engine operational region from being excessively broadened under conditions where the variable valve timing mechanism is in the operation inhibited state. Thus, regardless of whether the variable valve timing mechanism is in the operation allowed state or in the operation inhibited state, it is possible to maximally improve the fuel economy and to suppress deterioration of the combustion conditions.

In the above aspects, the variable valve timing mechanism may vary the open/close characteristics of an intake valve of the internal combustion engine, the engine operational region in which the cylinder deactivation operation is performed in the cylinder deactivation control may be determined based on an engine speed and an engine load, and the engine operational region may be narrowed in a direction toward an engine low-load side when the variable valve timing mechanism is in the operation inhibited state as compared to when the variable valve timing mechanism is in the operation allowed state.

When the variable valve timing mechanism is in the operation allowed state, the open/close characteristics of the intake valve are controlled so as to be made suitable for the current engine operating conditions and the combustion conditions are therefore kept in good conditions, so that it is possible to maximally improve the fuel economy by maximally broadening, to the high load side, for example, the engine operational region in which the cylinder deactivation operation is performed in the cylinder deactivation control. On the other hand, when the variable valve timing mechanism is in the operation inhibited state, the open/close characteristics of the intake valve are not always suitable for the current engine operating conditions. Thus, it cannot be said that the current combustion conditions are kept in good conditions, and there is a imitation in broadening the engine operational region in which the cylinder deactivation operation is performed. Specifically, when the engine operational region, in which the cylinder deactivation operation is performed, is excessively broadened to the high load side, the combustion conditions in the operating cylinder that is operating in the cylinder deactivation operation can be deteriorated in the high load side of the such operational region. It is presumed that such deterioration in the combustion conditions in the operating cylinder occurs because, due to performance of the cylinder deactivation operation, the amount of air taken into the operating cylinder per cycle exceeds the amount of air that can be actually taken in, which influences the combustion of the mixture.

According to the above configuration, the engine operational region in which the cylinder deactivation operation is performed in the cylinder deactivation control is narrowed in the direction toward the low load side when the variable valve timing mechanism is in the operation inhibited state as compared to when the variable valve timing mechanism is in the operation allowed state. Thus, it is possible to maximally broaden the engine operational region under the conditions where the variable valve timing mechanism is in the operation allowed state, and at the same time, it is possible to appropriately prevent the engine operational region from being excessively broadened to the engine high-load side under conditions where the variable valve timing mechanism is in the operation inhibited state. Thus, when the variable valve timing mechanism is in the operation inhibited state, it is possible to appropriately suppress deterioration of the combustion conditions as described above by performing the cylinder deactivation operation through the cylinder deactivation control.

The above aspects of the invention may be configured such that, in the cylinder deactivation control, referring to maps each of which defines the engine operational region in which the cylinder deactivation operation is performed, the cylinder deactivation operation is performed when the engine operating conditions fall within the engine operational region, and the all cylinder operation is performed when the engine operating conditions do not fall within the engine operational region, the maps include a first map that is associated with the operation allowed state of the variable valve timing mechanism and a second map that is associated with the operation inhibited state of the variable valve timing mechanism, and, as the map used in the cylinder deactivation control, the first map is selected when the variable valve timing mechanism is in the operation allowed state, and the second map is selected when the variable valve timing mechanism is in the operation inhibited state.

According to the above configuration, as the map used in the cylinder deactivation control, one of the first and second maps is selected depending on whether the variable valve timing mechanism is in the operation allowed state or in the operation inhibited state. The first and second maps are set so that the engine operational region in which the cylinder deactivation operation is performed differs according to the state of the variable valve timing mechanism. Thus, it is possible to appropriately change the engine operational region in which the cylinder deactivation operation is performed, by selecting and using one of these maps.

In the above aspects, the variable valve timing mechanism may be operated based on an operation command value that is calculated with reference to a map based on the engine operating conditions, and the map may be set so that the operation command value corresponding to the all cylinder operation is calculated in the engine operational region in which the all cylinder operation is performed in the cylinder deactivation control, and the operation command value corresponding to the cylinder deactivation operation is calculated in the engine operational region in which the cylinder deactivation operation is performed in the cylinder deactivation control.

The operation command value of the variable valve timing mechanism that makes the open/close characteristics of the engine valves optimum for the current engine operating conditions differs depending on whether the internal combustion engine is in the all cylinder operation or in thy cylinder deactivation operation. According to the above configuration, it is possible to, when the internal combustion engine is in the all cylinder operation, calculate the operation command value of the variable valve timing mechanism that is suited for the all cylinder operation, and it is also possible to, when the internal combustion engine is in the cylinder deactivation operation, calculate the operation command value of the variable valve timing mechanism that is suited for the cylinder deactivation operation. Thus, regardless of whether the internal combustion engine is in the all cylinder operation or in the cylinder deactivation operation, it is possible to make the open/close characteristics of the engine valves optimum for the current engine operating conditions by operating the variable valve timing mechanism based on the operation command value calculated in this way.

A third aspect of the invention is a method of controlling an internal combustion engine that includes a variable valve timing mechanism that continuously varies open/close characteristics of an engine valve of each of cylinders, and in which cylinder deactivation control is performed that switches, according to the engine operating conditions, the internal combustion engine between all cylinder operation, in which all of the cylinders are operated, and cylinder deactivation operation, in which operation of part of the cylinders is stopped, the method including: switching the variable valve timing mechanism between an operation allowed state and an operation inhibited state while the cylinder deactivation control is performed; and changing an engine operational region in which the cylinder deactivation operation is performed in the cylinder deactivation control, depending on whether the variable valve timing mechanism is in the operation allowed state or in the operation inhibited state.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
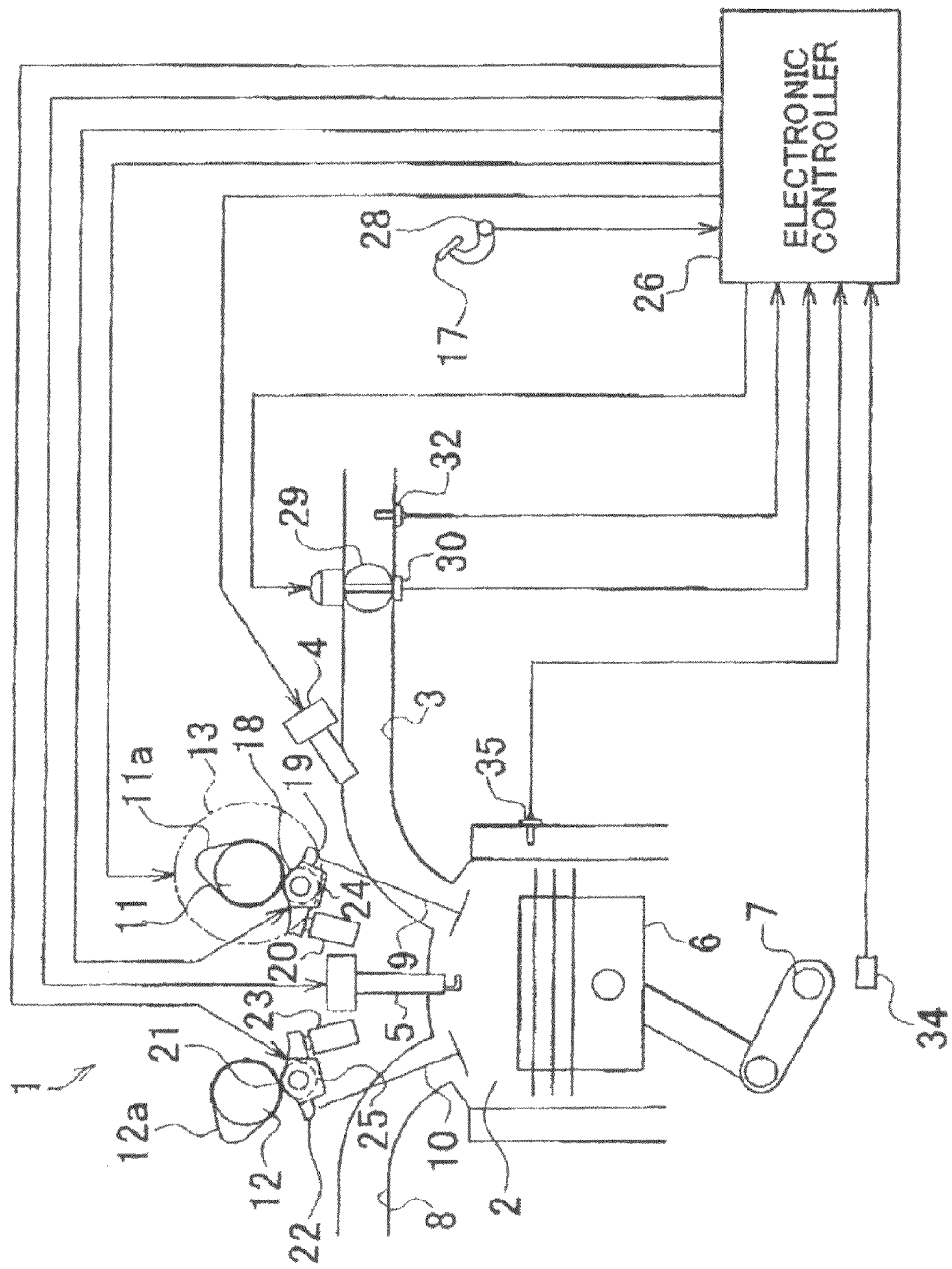
FIG. 1 shows a schematic diagram showing a construction of an engine to which a controller of an embodiment of the invention is applied.

An embodiment in which the invention is applied to an in-line multi-cylinder engine for an automobile will be described below with reference to FIGS. 1 to 5. In an engine 1 shown in FIG. 1, the degree of opening of a throttle valve 29 provided in an intake passage 3 is adjusted according to the amount of depression of an accelerator pedal 17 (accelerator pedal depression amount) etc., and air the amount of which corresponds to the degree of opening of the throttle valve 29 is taken into a combustion chamber 2 of each cylinder through the intake passage 3. Fuel the amount of which corresponds to the amount of air taken into the engine 1 is injected from a fuel injection valve 4 into the intake passage 3 of the engine 1. As a result, an air-fuel mixture is formed in the combustion chamber 2 of each cylinder of the engine 1. When the mixture is ignited by a spark plug 5, the mixture burns, causing a piston 6 to reciprocate, whereby a crankshaft 7 rotates, which is an output shaft of the engine 1. The mixture burned is discharged from the combustion chamber 2 as exhaust gas into an exhaust passage 8.

In each cylinder of the engine 1, the communication between the combustion chamber 2 and the intake passage 3 is established and cut off by opening and closing of an intake valve 9, and the communication between the combustion chamber 2 and the exhaust passage 8 is established and cut off by opening and closing of an exhaust valve 10. The intake valve 9 and the exhaust valve 10 are opened and closed as an intake cam shaft 11 and an exhaust cam shaft 12 rotate to which rotation of the crankshaft 7 is transmitted. More specifically, a rocker arm 19 provided with a roller 18 is provided between the intake valve 9 and an intake cam 11a fixed to the intake cam shaft 11, and the pushing force exerted on the roller 18 by the rotating intake cam 11a causes the rocker arm 19 to pivot about the contact point between the rocker arm 19 and a lash adjuster 20, one end of which is supported by the rocker arm 19, whereby the intake valve 9 is pushed. The pushing force exerted on the intake valve 9 by the rocker arm 19 opens and closes the intake valve 9. On the other hand, a rocker arm 22 provided with a roller 21 is provided between the exhaust valve 10 and an exhaust cam 12a fixed to the exhaust cam shaft 12, and the pushing force exerted on the rocker arm 22 by the rotating exhaust cam 12a causes the rocker arm 22 to pivot about the contact point between the rocker arm 22 and a lash adjuster 23, one end of which is supported by the rocker arm 22, whereby the exhaust valve 10 is pushed. The pushing force exerted on the exhaust valve 10 by the rocker arm 22 opens and closes the exhaust valve 10.

In the engine 1, in addition to all cylinder operation in which all the cylinders are operated, cylinder deactivation operation is performed in which operation of part of the cylinders is stopped in order to improve fuel economy etc. and the remaining cylinders are operated. Such cylinder deactivation operation is performed by stopping injecting fuel from the fuel injection valve 4, stopping supplying electricity to the spark plug 5 for igniting the mixture, and stopping lifting the intake valve 9 and the exhaust valve 10. Stopping lifting the intake valve 9 and the exhaust valve 10 is performed by lift stop mechanisms 24 and 25 provided for the rocker arms 19 and 22.

The lift stop mechanism 24 is provided for the rocker arm 19 located between the intake cam 11a and the intake valve 9 to stop lifting (opening and closing) of the intake valve 9 caused by the pushing force exerted on the rocker arm 19 (roller 18) by the intake cam 11a. The lift stop mechanism 24 is switched between a state in which the movement of the roller 18 relative to the rocker arm 19 in the direction of the pushing is allowed and a state in which such a relative movement is inhibited. Normally, the lift stop mechanism 24 is in the state in which such a relative movement is inhibited. In this state, when the roller 18 is pushed by the intake cam 11a, the rocker arm 19 accordingly pivots as described above, and the intake valve 9 is opened and closed. On the other hand, in order to stop lifting the intake valve 9, the lift stop mechanism 24 is switched to the state in which the lift stop mechanism 24 allows the roller 18 to move relative to the rocker arm 19. In this case, when the roller 18 is pushed by the intake cam 11a, the roller 18 moves relative to the rocker arm 19, and the rocker arm 19 therefore does not pivot to open and close the intake valve 9, so that lifting of the intake valve 9 caused by the rotation of the intake cam 11a is stopped.

The lift stop mechanism 25 is provided for the rocker arm 22 located between the exhaust cam 12a and the exhaust valve 10 to stop lifting (opening and closing) of the exhaust valve 10 caused by the pushing force exerted on the rocker arm 22 (roller 21) by the exhaust cam 12a. The lift stop mechanism 25, constructed similarly to the lift stop mechanism 24, is switched between a state in which the movement of the roller 21 relative to the rocker arm 22 in the direction of the pushing is allowed and a state in which such a relative movement is inhibited. Normally, the lift stop mechanism 25 is in the state in which the movement of the roller 21 relative to the rocker arm 22 is inhibited. In this state, when the roller 21 is pushed by the exhaust cam 12a, the rocker arm 22 accordingly pivots as described above, and the exhaust valve 10 is opened and closed. On the other hand, in order to stop lifting the exhaust valve 10, the lift stop mechanism 25 is switched to the state in which the lift stop mechanism 25 allows the roller 21 to move relative to the rocker arm 22. In this case, when the roller 21 is pushed by the exhaust cam 12a, the roller 21 moves relative to the rocker arm 22, and the rocker arm 22 therefore does not pivot to open and close the exhaust valve 10, so that lifting of the exhaust valve 10 caused by the rotation of the exhaust cam 12a is stopped.

The engine 1 is provided with a variable valve timing mechanism 13, which continuously varies the open/close characteristics of the intake valve 9, among the engine valves, such as the intake valve 9 and the exhaust valve 10. The variable valve mechanism 13 varies the valve timing of the intake valve 9 by changing the rotational phase of the intake cam shaft 11 relative to the crankshaft 7. By driving the variable valve timing mechanism 13, the valve opening timing and the valve closing timing of the intake valve 9 are advanced or retarded while keeping the valve open period (operating angle) of the intake valve 9, whereby the valve opening timing and the valve closing timing of the intake valve 9 are optimized in terms of the operating conditions of the engine (combustion of the mixture).

Next, an electrical configuration of a controller of the engine 1 according to the embodiment will be described. The controller is provided with an electronic controller 26 that performs various control operations, such as driving control of the engine 1. The electronic controller 26 includes: a central processing unit (CPU) that performs arithmetic processing related to the above-mentioned various control operations; a read only memory (ROM) in which programs and data required to control the CPU are stored; a random access memory (RAM) in which the result of calculation performed by the CPU is temporarily stored; and input/output ports for outputting and receiving signals to and from the external devices.

Various sensors, etc. listed below are connected to the input ports of the electronic controller 26.

Accelerator pedal position sensor 28 for detecting the amount of depression of the accelerator pedal 17 (accelerator pedal depression amount) that is depressed by the driver of the automobile.

A throttle valve position sensor 30 for detecting the degree of opening of the throttle valve 29 (throttle valve opening degree) provided in the intake passage 3.

An air flow meter 32 for detecting the amount of air taken into the combustion chamber 2 through the intake passage 3.

A crank position sensor 34 that outputs a signal corresponding to the rotation of the crankshaft 7 and is used to, for example, calculate the engine speed.

A coolant temperature sensor 35 for detecting the temperature of the coolant of the engine 1.

The drive circuits for the fuel injection valve 4, the spark plug 5, the variable valve timing mechanism 13, the lift stop mechanisms 24 and 25, and the throttle valve 29 are connected to the output ports of the electronic controller 26.

The electronic controller 26 monitors the engine operating conditions, such as the accelerator pedal depression amount, the throttle valve opening degree, the intake air amount, the engine speed, and the engine load, based on the detection signals received from the above-described various sensors. The engine speed is determined based on the detection signal received from the crank position sensor 34. The engine load is determined based on the engine speed and the amount of air taken into the engine 1 that is determined based on the detection signals received from the acceleration pedal position sensor 28, the throttle valve position sensor 30, and the air flow meter 32, for example. The electronic controller 26 outputs command signals to the various drive circuits connected to the output ports according to the above-described engine operating conditions. In this way, various control operations, such as fuel injection control for the fuel injection valve 4, ignition timing control for the spark plug 5, valve timing control for the intake valve 9, drive control for the lift stop mechanisms 24 and 25, and opening degree control for the throttle valve 29, are performed by the electronic controller 26.

The valve timing control for the intake valve 9 is performed through the operation of the variable valve timing mechanism 13 so that the valve timing of the intake valve 9 becomes suitable for the current engine operating conditions (combustion conditions). However, when the temperature of the engine 1 is low, it is difficult to keep the combustion conditions good through the valve timing control because of reduction in the volatility of fuel, etc., and therefore, the variable valve timing mechanism 13 is brought into a state (herein referred to as the "operation inhibited state"), in which the variable valve timing mechanism 13 is inhibited from operating, to prevent the valve timing control from being performed. Specifically, when the temperature of the coolant of the engine 1 is equal to or lower than a predetermined value B that is a threshold temperature for operation of the variable valve timing mechanism 13, above which the variable valve timing mechanism 13 is allowed to operate, the variable valve timing mechanism 13 is brought into the operation inhibited state and the valve timing control is stopped. When the variable valve timing mechanism 13 is brought into the operation inhibited state and the valve timing control is stopped, the variable valve timing mechanism 13 is controlled so that the valve timing of the intake valve 9 is fixed at predetermined timing, that is, fully retarded timing, for example. On the other hand, when the temperature of coolant of the engine 1 is higher than the predetermined value B, the variable valve timing mechanism 13 is brought into a state (herein referred to as the "operation allowed state"), in which the variable valve timing mechanism 13 is allowed to operate, and the above-described valve timing control is performed.

Next, cylinder deactivation control by which the operation of the engine 1 is switched between the all cylinder operation and the cylinder deactivation operation in accordance with the engine operating conditions will be described in detail. The cylinder deactivation operation in the cylinder deactivation control is performed by stopping the operation of part of the cylinders of the engine 1. In the part of the cylinders in which operation is stopped (hereinafter referred to as the "deactivated cylinder"), injection of fuel by the fuel injection valve 4 and ignition by the spark plug 5 are stopped, and lifting of the intake valve 9 and the exhaust valve 10 by the lift stop mechanisms 24 and 25 is stopped. With regard to the deactivated cylinder, the deactivated cylinder may always be the same when the cylinder deactivation operation is performed, or instead, the deactivated cylinder may be changed every time the cylinder deactivation operation is performed. When the deactivated cylinder is always the same when the cylinder deactivation operation is performed, it is preferable that the lift stop mechanisms 24 and 25 be omitted for the cylinders other than the deactivated cylinder and the rollers 18 and 21 are provided directly on the rocker arms 19 and 22, in view of suppressing the increase in the number of parts constituting the engine 1.

In the cylinder deactivation control, the cylinder deactivation operation is performed when the engine 1 is in low-speed, low-load operation, and in other conditions, the all cylinder operation is performed. This is because there is a tendency that the fuel economy is better when the engine 1 is in high load operation, that is, when the engine is operated under conditions in which the amount of air (mixture) taken into the operating cylinder per cycle is large, and it is intended to improve the fuel economy of the engine 1 in consideration of such fuel economy characteristics of the engine 1.

In the above-described cylinder deactivation control, when the engine 1 is in low load operation, in which the fuel economy of the engine 1 is relatively poor, and there is therefore a fear that the amount of air (mixture) taken into the operating cylinder per cycle is reduced, the operation of part of the cylinders is stopped by the cylinder deactivation operation, so that the amount of air (mixture) taken into the remaining operating cylinder is increased. As a result, the amount of air (the amount of mixture) taken into the operating cylinder per cycle in the cylinder deactivation operation becomes closer to the amount of air (the amount of mixture) taken into the operating cylinder per cycle when the engine is in high load operation during the all cylinder operation. Thus, the fuel economy of the engine 1 when the engine 1 is in low load operation is improved.

In order to improve the fuel economy of the engine 1, it is preferable that the engine operational region in which the cylinder deactivation operation is performed in the cylinder deactivation control be maximally broadened. However, if the engine operational region in which the cylinder deactivation operation is performed is excessively broadened, depending on the engine operating conditions, combustion conditions are deteriorated in the operating cylinder that is operating in the cylinder deactivation operation. If the engine operational region in which the cylinder deactivation operation is performed is excessively broadened to the high load side, for example, combustion conditions in the operating cylinder that is operating in the cylinder deactivation operation are deteriorated when the engine operating conditions are in a high-load side of the engine operational region in which the cylinder deactivation operation is performed. It is presumed that such deterioration in the combustion conditions in the operating cylinder occurs because the amount of air taken into the operating cylinder per cycle exceeds the amount of air that can be actually taken in when the cylinder deactivation operation is performed under above-described conditions, which influences the combustion of the mixture. Thus, in the cylinder deactivation control, the engine operational region in which the cylinder deactivation operation is performed is determined in consideration of the above-described circumstances, the cylinder deactivation operation is performed only in the thus determined region, and the all cylinder operation is performed in other region.

Meanwhile, in the engine 1 in which both the cylinder deactivation control and the control of the valve timing of the intake valve 9 are performed, if the engine operational region in which the cylinder deactivation operation is performed in the cylinder deactivation control is determined without taking account of the control of the valve timing of the intake valve 9 that is performed by operating the variable valve timing mechanism 13, there is a fear that the following problem concerning the fuel economy and the combustion conditions of the engine 1 occurs.

When the variable valve timing mechanism 13 is in the operation allowed state and the valve timing of the intake valve 9 is controlled so as to be made suitable for the current engine operating conditions, the combustion conditions are kept in good conditions, and it is therefore possible to perform the cylinder deactivation operation in the cylinder deactivation control in a broad engine operational region. When the engine operational region is determined without taking account of such a thing, there is a fear that the determined engine operational region is too narrow. In this case, despite the fact that the engine is in operating conditions in which it is possible to perform the cylinder deactivation operation while keeping the combustion conditions at allowable levels, the cylinder deactivation operation is not performed when the engine is in such operating conditions, which can accordingly reduce the degree of improvement of the fuel economy of the engine 1.

On the other hand, when the variable valve timing mechanism 13 is in the operation inhibited state and the valve timing of the intake valve 9 is fixed at the predetermined timing (fully retarded timing), the valve timing of the intake valve 9 is not always suited for the current engine operating conditions. Thus, it cannot be said that the combustion conditions during this situation are always kept in good conditions, and therefore, it becomes difficult to perform the cylinder deactivation operation in the cylinder deactivation control in a broad engine operational region. When the engine operational region in which the cylinder deactivation operation is performed in the cylinder deactivation control is determined without taking account of such a thing, there is a fear that the determined engine operational region is excessively broad. In this case, despite the fact that the engine is in operating conditions in which the cylinder deactivation operation can deteriorate combustion conditions, the cylinder deactivation operation is performed, which results in deterioration in the combustion conditions.

Next, the cylinder deactivation control of the embodiment with which it is possible to suppress the occurrence of above-described problems will be described with reference to a flow chart shown in FIG. 2, which shows a cylinder deactivation control routine. The cylinder deactivation control routine is periodically performed by the electronic controller 26 by interruption in a predetermined cycle, for example.

In this routine, in order to determine whether the temperature of the engine 1 is at a value at which the cylinder deactivation control can be performed, it is determined whether the temperature of coolant of the engine 1 is higher than a predetermined value A that is the threshold coolant temperature for performance of the cylinder deactivation control, above which the cylinder deactivation control is performed (S101). When the engine 1 is in a low temperature state in which it is difficult to keep the combustion conditions in good conditions because of reduction in the volatility of fuel, etc., there is a fear that problems, such as deterioration in the combustion conditions in the operating cylinder, are caused when the cylinder deactivation operation is performed in the cylinder deactivation control. The predetermined value A is a value determined in advance through experiments etc., above which there is no fear that the above-described problems may occur when the cylinder deactivation operation is performed. In this embodiment, the predetermined value A is lower than the predetermined value B that is the threshold temperature for operation of the variable valve timing mechanism 13.

When the determination result is negative in step S101, the cylinder deactivation control is stopped (S105) and the all cylinder operation is performed. When the determination result is positive in step S101, it is determined whether the temperature of coolant of the engine 1 is higher than the predetermined value A (S102), that is, whether the variable valve timing mechanism 13 is in the operation allowed state and the control of the valve timing of the intake valve 9 is therefore being performed.

Figure 2:
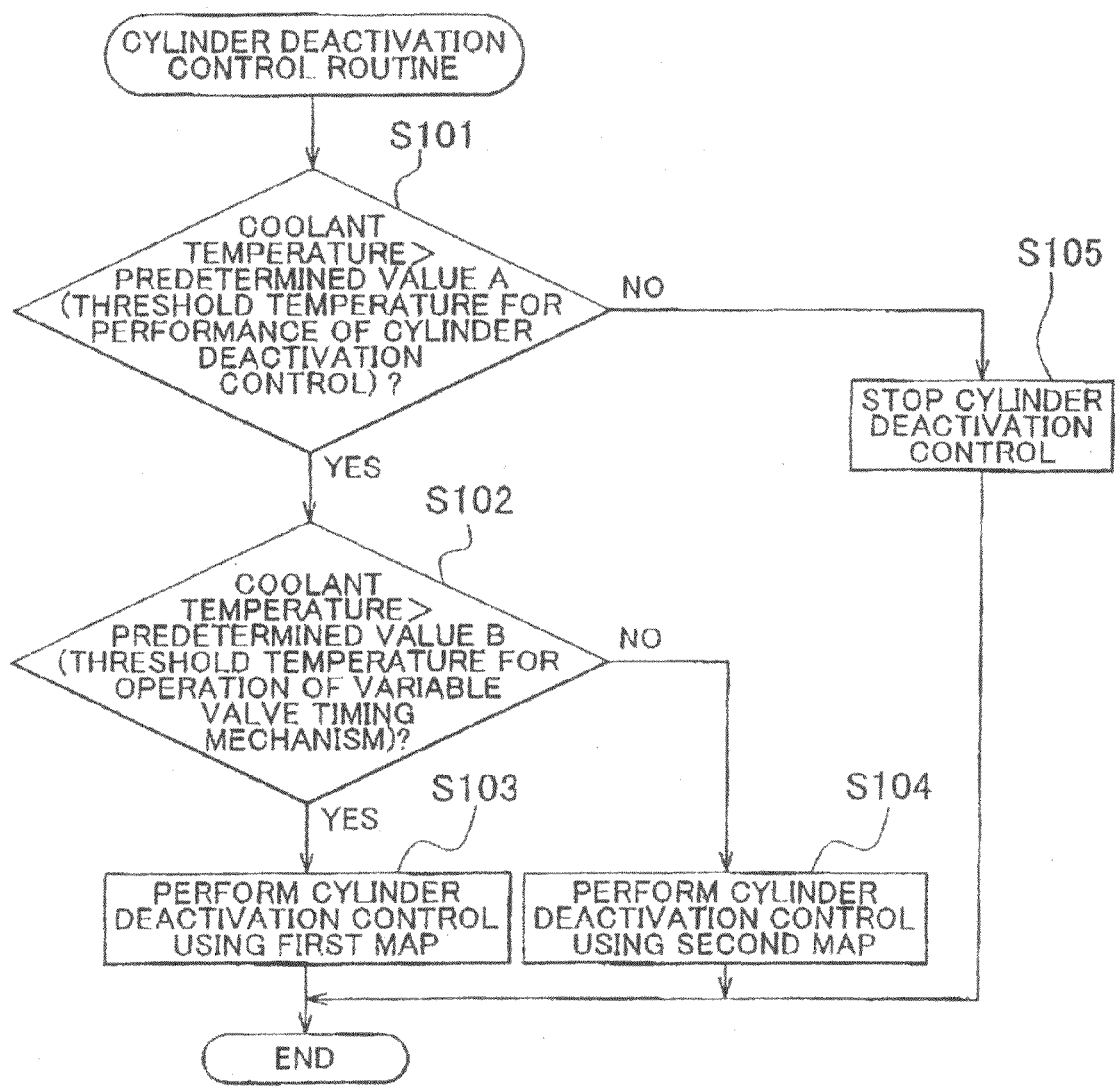
FIG. 2 shows a flow chart showing a procedure of cylinder deactivation control.
Figure 3A:
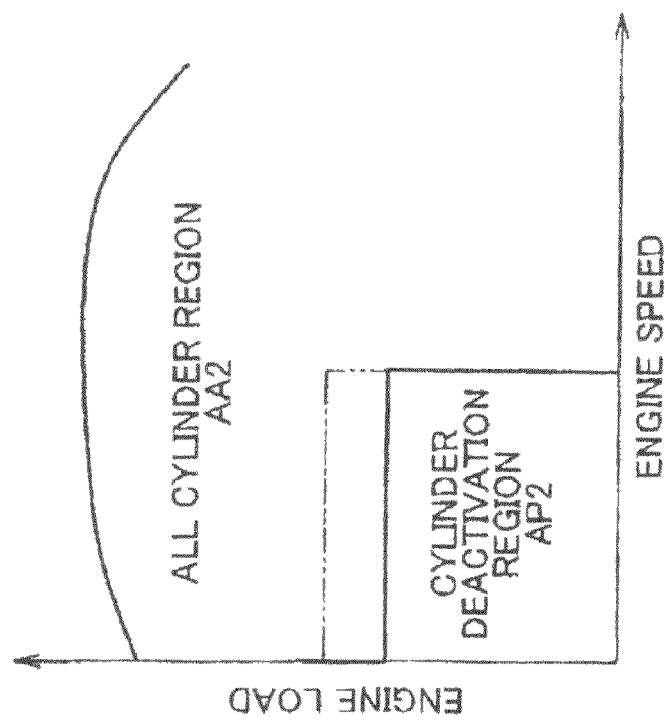
FIG. 3A shows a first map used to perform the cylinder deactivation control when a variable valve timing mechanism is in an operation allowed state.

When the determination result is positive in step S102, the cylinder deactivation control is performed using a first map shown in FIG. 3A (S103 in FIG. 2). More specifically, the switching between the all cylinder operation and the cylinder deactivation operation in the cylinder deactivation control is performed referring to the first map. The first map defines, based on the engine load and the engine speed, a cylinder deactivation region AP1 that is the engine operational region in which the cylinder deactivation operation is performed in the cylinder deactivation control, and also defines an all cylinder region AA1 that is the engine operational region, in which the all cylinder operation is performed, other than the cylinder deactivation region AP1. When the engine speed and the engine load fall within the cylinder deactivation region AP1, the cylinder deactivation operation is performed, and on the other hand, when the engine speed and the engine load fall within the all cylinder region AA1, the all cylinder operation is performed. In the first map, the cylinder deactivation region AP1 is defined on the assumption that the valve timing of the intake valve 9 is controlled so that the valve timing is made suitable for the current engine operating conditions. Thus, the fact that the cylinder deactivation control is performed using the first map means that the engine operational region in which the cylinder deactivation operation is performed is a region (cylinder deactivation region AP1) defined on the assumption that the valve timing of the intake valve 9 is controlled so that the valve timing is made suitable for the current engine operating conditions.

On the other hand, when the determination result is negative in step 8102 (FIG. 2), the variable valve timing mechanism 13 is in the operation inhibited state and the control of the valve timing of the intake valve 9 is not being performed. Thus, in this case, the valve timing of the intake valve 9 is fixed at predetermined timing (fully retarded thing, in this embodiment). In this case, the cylinder deactivation control is performed using a second map shown in FIG. 3B (S104 in FIG. 2). More specifically, the switching between the all cylinder operation and the cylinder deactivation operation in the cylinder deactivation control is performed referring to the second map. The second map also defines, based on the engine load and the engine speed, a cylinder deactivation region AP2 that is the engine operational region in which the cylinder deactivation operation is performed in the cylinder deactivation control, and also defines an all cylinder region AA2 that is the engine operational region, in which the all cylinder operation is performed, other than the cylinder deactivation region AP2. When the engine speed and the engine load fall within the cylinder deactivation region AP2, the cylinder deactivation operation is performed, and on the other hand, when the engine speed and the engine load fall within the all cylinder region AA2, the all cylinder operation is performed. In the second map, the cylinder deactivation region AP2 is defined on the assumption that the valve timing of the intake valve 9 is fixed at the fully retarded liming. Thus, the fact that the cylinder deactivation control is performed using the second map means that the engine operational region in which the cylinder deactivation operation is performed is a region (the cylinder deactivation region AP2) defined on the assumption that the valve timing of the intake valve 9 is fixed at the fully retarded timing.

As described above, the engine operational region in which the cylinder deactivation operation is performed is switched between the cylinder deactivation regions AP1 and AP2 depending on whether the variable valve timing mechanism 13 is in the operation allowed state and the control of the valve timing of the intake valve 9 is being performed, or the variable valve timing mechanism 13 is in the operation inhibited state and the control of the valve timing of the intake valve 9 is stopped. In this way, depending on whether the variable valve timing mechanism 13 is in the operation allowed state or in the operation inhibited state, the engine operational region in which the cylinder deactivation operation is performed can be set so that the engine operational region is made suitable for each of these state. Thus, regardless of whether the control of the valve timing of the intake valve 9 is being performed or stopped, the engine operational region in which the cylinder deactivation operation is performed is made to have appropriate size. As a result, it is possible to improve the fuel economy by performing the cylinder deactivation operation in a maximally broad engine operational region. In addition, it is possible to suppress the deterioration in combustion conditions caused by performing the cylinder deactivation operation due to an excessively broad engine operational region.

The cylinder deactivation region AP1 and the cylinder deactivation region AP2 will be described in detail with reference to FIGS. 3A and 3B. When the variable valve timing mechanism 13 is in the operation allowed state, the valve liming of the intake valve 9 is controlled so that the valve timing of the intake valve 9 is made suitable for the engine operating conditions and the combustion conditions are therefore kept in good conditions, so that it is possible to maximally improve the fuel economy by maximally broadening, to the high load side for example, the engine operational region (cylinder deactivation region AP1) in which the cylinder deactivation operation is performed in the cylinder deactivation control. On the other hand, when the variable valve timing mechanism 13 is in the operation inhibited state, the valve timing of the intake valve 9 is fixed at fully retarded timing and this timing is not always suitable for the current engine operating conditions. Thus, it cannot be said that the current combustion conditions are kept in good conditions, and there is a limitation in broadening the engine operational region (cylinder deactivation region AP2) in which the cylinder deactivation operation is performed. Specifically, when the engine operational region (cylinder deactivation region AP2), in which the cylinder deactivation operation is performed, is excessively broadened to the high load side, the combustion conditions in the operating cylinder that is operating in the cylinder deactivation operation can be deteriorated in the high load side of the such operational region. It is presumed that such deterioration in the combustion conditions in the operating cylinder occurs because the amount of air taken into the operating cylinder per cycle exceeds the amount of air that can be actually taken in when the cylinder deactivation operation is performed under above-described conditions, which influences the combustion of the mixture.

Figure 3B:
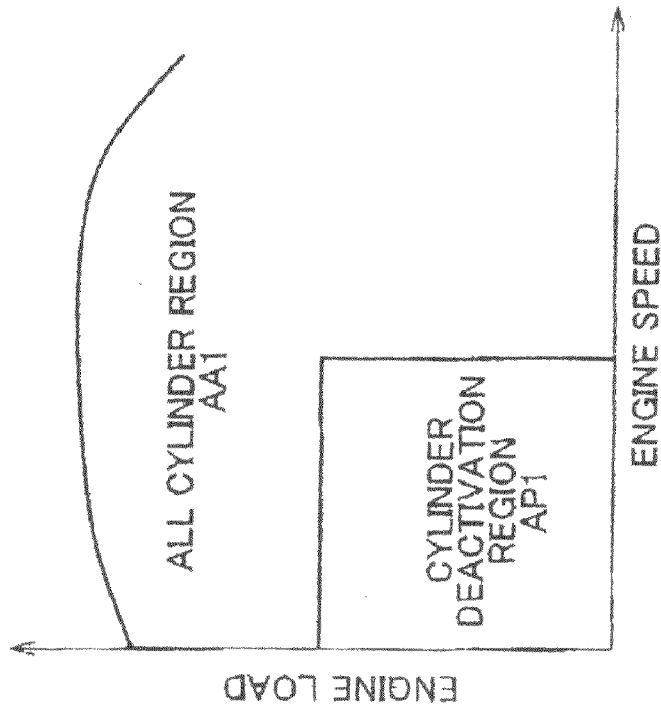
FIG. 3B shows a second map used to perform the cylinder deactivation control when the variable valve timing mechanism is in an operation inhibited state.

As can be seen from FIGS. 3A and 3B, the cylinder deactivation region AP2 is narrowed in the direction toward the low load side as compared to the cylinder deactivation region AP1. In FIG. 3B, the cylinder deactivation region AP1 is shown by a region that is surrounded by the chain double-dashed line and the solid line. As compared to the cylinder deactivation region AP1; the cylinder deactivation region AP2 is narrowed in the direction toward the low load side as shown by the region surrounded by the solid line. Thus, when the variable valve timing mechanism 13 is in the operation allowed state and the valve timing of the intake valve 9 is controlled so that the valve timing is made suitable for the current engine operating conditions, it is possible to maximally broaden the engine operational region (cylinder deactivation region AP1) in which the cylinder deactivation operation is performed, so that it is possible to maximally improve the fuel economy of the engine 1. On the other hand, when the variable valve timing mechanism 13 is in the operation inhibited state and the valve timing of the intake valve 9 is fixed at the maximally retarded timing, the engine operational region (cylinder deactivation region AP2) in which the cylinder deactivation operation is performed is prevented from being excessively broadened to the engine high load side. Thus, the deterioration of combustion conditions in the operating cylinder caused by the cylinder deactivation operation in the high load side of the engine operational region is suppressed.

Figure 4:
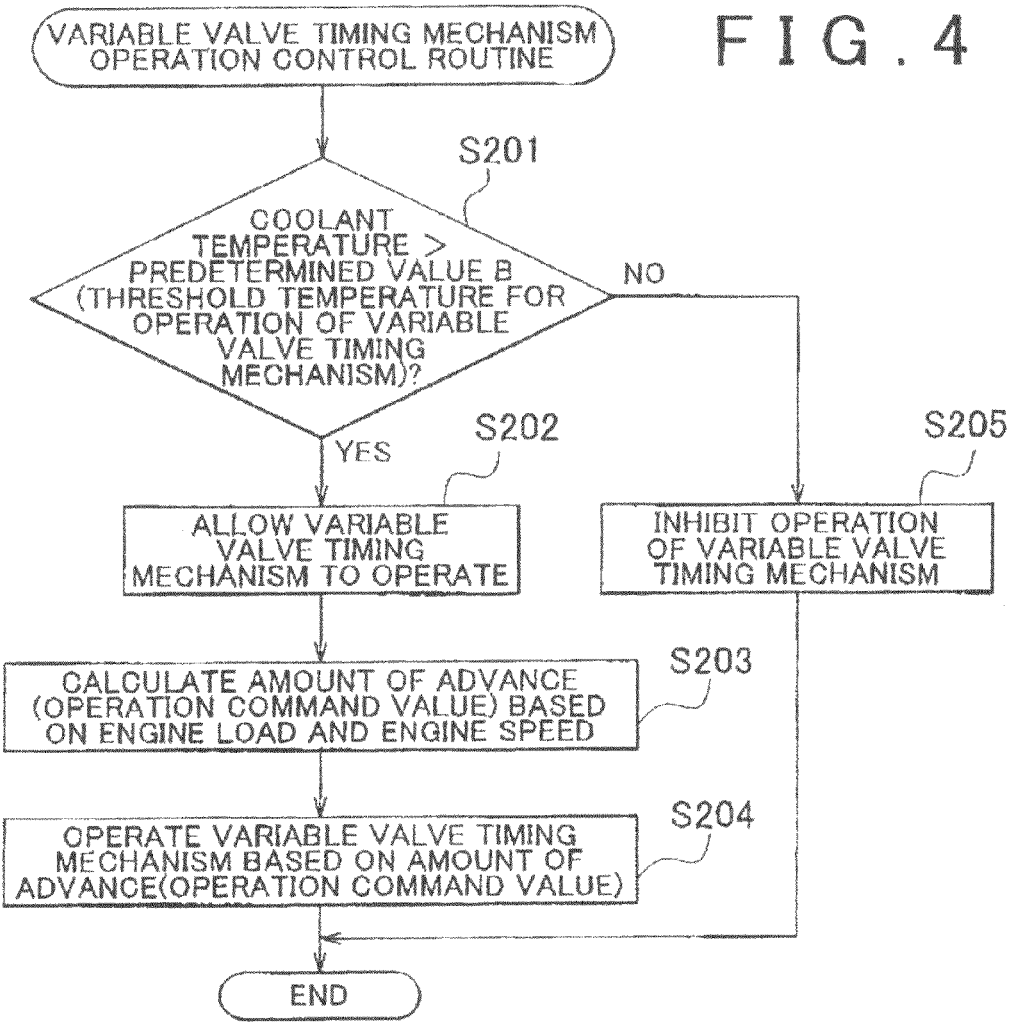
FIG. 4 shows a flow chart showing a control procedure of operation of the variable valve timing mechanism.

The process of the operation of the variable valve timing mechanism 13 related to control of the valve timing of the intake valve 9 will be described with reference to the flow chart in FIG. 4 showing a routine for controlling the operation of the variable valve timing mechanism. The variable valve timing mechanism operation control routine is periodically performed by the electronic controller 26 by interruption in a predetermined cycle, for example.

In this routine, a process for switching the variable valve timing mechanism 13 between the operation allowed state and the operation inhibited state according to the engine operating conditions (coolant temperature in this embodiment), is performed. Specifically, it is determined whether the coolant temperature of the engine 1 is higher than the above-described predetermined value B (S201), in other words, whether the coolant temperature is higher than the threshold coolant temperature for operation of the variable valve timing mechanism 13. When the determination result is negative, the variable valve timing mechanism 13 is brought into the operation inhibited state (S205), and the control of the valve timing of the intake valve 9 is stopped. In this case, the variable valve timing mechanism 13 is controlled so that the valve timing of the intake valve 9 is fixed at the fully retarded timing.

On the other hand, when the determination result is positive in step S201 and it is determined that the coolant temperature of the engine 1 is higher than the predetermined value B, the variable valve timing mechanism 13 is brought into the operation allowed state (S202), and the control of the valve timing of the intake valve 9 is performed (S203, S204). Specifically, the amount of advance, which is the operation command value of the variable valve timing mechanism 13, is calculated based on the engine load and the engine speed while referring to the map (S203), the variable valve timing mechanism 13 is operated based on the amount of advance calculated (S204), and the valve timing of the intake valve 9 is controlled so that the valve timing is made suitable for the engine operating conditions. The valve timing of the intake valve 9 controlled in this way is the fully retarded timing when the amount of advance is "0", and is advanced as the amount of advance calculated increases.

Figure 5:
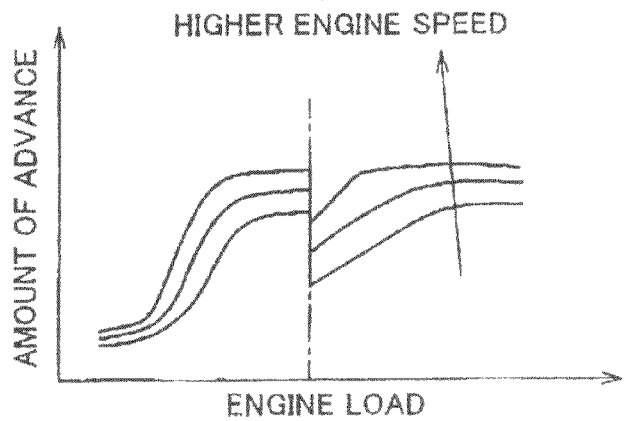
FIG. 5 shows a graph showing how the amount of advance varies as an engine load varies under conditions in which engine speed falls within a cylinder deactivation region AP1.

The map that is used in step S203 is set so that the amount of advance corresponding to the all cylinder operation is calculated when the engine operating conditions fall within the engine operational region (all cylinder region AA1), in which the all cylinder operation is performed in the cylinder deactivation control, and the amount of advance corresponding to the cylinder deactivation operation is calculated when the engine operating conditions fall within the engine operational region (cylinder deactivation region AP1), in which the cylinder deactivation operation is performed in the cylinder deactivation control. Thus, the amount of advance calculated referring to the map varies as shown in FIG. 5, for example; as the engine load and the engine speed vary. FIG. 5 is a graph showing how the amount of advance varies as the engine load varies under the conditions in which the engine speed falls within the cylinder deactivation region AP1. The low load region in FIG. 5 is included in the cylinder deactivation region AP1 and the high load region in FIG. 5 is included in the all cylinder region AA1. As shown in FIG. 5, when the engine load falls within the low load region (cylinder deactivation region AP1), the amount of advance becomes a value corresponding to the cylinder deactivation operation and when the engine load falls within the high load region (all cylinder region AA1), the amount of advance becomes a value corresponding to the all cylinder operation.

According to the embodiment described above in detail, the following effects are achieved. First, the engine operational region in which the cylinder deactivation operation is performed in the cylinder deactivation control is switched between the cylinder deactivation region AP1 and the cylinder deactivation region AP2 depending on whether the variable valve timing mechanism 13 is in the operation allowed state and the control of the valve timing of the intake valve 9 is being performed, or the variable valve timing mechanism 13 is in the operation inhibited state and the control of the valve timing is stopped. Thus, depending on whether the variable valve timing mechanism 13 is in the operation allowed state or in the operation inhibited state, the engine operational region in which the cylinder deactivation operation is performed can be set so that the engine operational region is made suitable for each of these states. Accordingly, regardless of whether the control of the valve timing of the intake valve 9 is being performed or stopped, the engine operational region in which the cylinder deactivation operation is performed is made to have appropriate size. As a result, it is possible to improve the fuel economy by performing the cylinder deactivation operation in a maximally broad engine operational region. In addition, it is possible to suppress the deterioration in combustion conditions caused by performing the cylinder deactivation operation due to excessively broad engine operational region.

Second, the cylinder deactivation region AP2 is narrowed in the direction toward the low load side as compared to the cylinder deactivation region AP1. Thus, when the variable valve timing mechanism 13 is in the operation allowed state and the valve timing of the intake valve 9 is controlled so that the valve timing is made suitable for the current engine operating conditions, it is possible to maximally broaden the engine operational region (cylinder deactivation region AP1) in which the cylinder deactivation operation is performed, so that it is possible to maximally improve the fuel economy of the engine 1. On the other hand, when the variable valve timing mechanism 13 is in the operation inhibited state and the valve timing of the intake valve 9 is fixed at the fully retarded timing, the engine operational region (cylinder deactivation region AP2) in which the cylinder deactivation operation is performed is prevented from being excessively broadened to the engine high load side. Thus, the deterioration of combustion conditions caused by performing the cylinder deactivation operation in the high load side of the engine operational region is suppressed.

Third, as the map, used to perform the cylinder deactivation control, in which the all cylinder region and the cylinder deactivation region are defined, the first map is selected that is associated with the operation allowed state when the variable valve timing mechanism 13 is in the operation allowed state, and on the other hand, the second map is selected that is associated with the operation inhibited state when the variable valve timing mechanism 13 is in the operation inhibited state. Because the first and second maps are set so as to have different cylinder deactivation regions, it is possible to appropriately change the cylinder deactivation region by selecting and using one of these maps.

Fourth, the map used to calculate the amount of advance that is the operation command value of the variable valve timing mechanism 13 is set so that the amount of advance corresponding to the all cylinder operation is calculated when the engine operating conditions fall within the all cylinder region AA1, and the amount of advance corresponding to the cylinder deactivation operation is calculated when the engine operating conditions fall within the cylinder deactivation region AP1. Depending on whether the engine 1 is in the all cylinder operation or in the cylinder deactivation operation, the amount of advance varies that makes the valve timing of the intake valve optimum for the current engine operating conditions. However, by calculating the amount of advance using the maps, it is possible to calculate the amount of advance suitable for the all cylinder operation when the engine is in the all cylinder operation, and calculate the amount of advance suitable for the cylinder deactivation operation when the engine is in the cylinder deactivation operation. Thus, by operating the variable valve timing mechanism 13 based on the amount of advance calculated in this way, it is possible to make the valve timing of the intake valve 9 optimum for the current engine operating conditions regardless of whether the engine is in the all cylinder operation or in the cylinder deactivation operation.

The above-described embodiment can be modified as follows, for example.

While, in the cylinder deactivation operation, lifting (opening and closing) of the engine valves, such as the intake valve 9 and the exhaust valve 10, of the cylinder the operation of which is deactivated is stopped by the lift stop mechanisms 24 and 25, there is no need to necessarily perform such stopping of lifting. Specifically, the lift stop mechanisms 24 and 25 in the cylinder that can be deactivated may be omitted, that is, a construction may be adopted in which the stopping of lifting the engine valves is not performed. Also in this case, the amount of air (the amount of mixture) taken into the operating cylinder per cycle during the cylinder deactivation operation increases as compared to the amount of air taken into the operating cylinder per cycle during the all cylinder operation under the same engine operating conditions. This is because when the cylinder deactivation operation is performed and the engine output power is therefore reduced, the driver increases the amount of depression of the accelerator pedal in order to compensate the reduction and as a result, the throttle valve 29 further opens and the amount of air passing through the intake passage 3 increases. Specifically, the amount of air passing through the intake passage 3 increases in this way, so that the amount of air (the amount of mixture) taken into the operating cylinder per cycle during the cylinder deactivation operation also increases.

The amount of advance that is the operation command value of the variable valve timing mechanism 13 does not have to be calculated so that the amount of advance becomes a value corresponding to the current operating conditions according to whether the engine is in the cylinder deactivation operation or in the all cylinder operation.

The cylinder deactivation region AP2 may be narrowed in the direction toward the low engine speed side as compared to the cylinder deactivation region AP1.

The invention may be applied to an engine in which the cylinder deactivation region AP2 can be set broader than the cylinder deactivation region AP1.

The variable valve timing mechanism 13 may be controlled so that the valve timing of the intake valve 9 is fixed at selected timing other than the fully retarded timing when the variable valve timing mechanism 13 is in the operation inhibited state.

Instead of fixing the number of deactivated cylinders (or the number of operating cylinders) in the cylinder deactivation operation, the number of deactivated cylinders may be variable according to the engine operating conditions etc. For example, a configuration may be adopted in which the lower the speed and the load of the engine 1 becomes, the greater the number of deactivated cylinders becomes, that is, the less the number of operating cylinders becomes.

The invention may be applied to an engine provided with a variable valve timing mechanism capable of varying the maximum lift and the operating angle, which is the open/close characteristics, of the intake valve 9.

The invention may be applied to an engine provided with a variable valve timing mechanism capable of varying the open/close characteristics, such as the valve timing, of the exhaust valve 10.

While the invention has been described with reference to example embodiments thereof, it is to be understood that the invention is not limited to the described embodiments or constructions. To the contrary, the invention is intended to cover various modifications and equivalent arrangements. In addition, while the various elements of the example embodiments are shown in various combinations and configurations, other combinations and configurations, including more, less or only a single elements are also within the spirit and scope of the invention.

What is claimed is:

1. A controller for an internal combustion engine in which open/close characteristics of an engine valve of each of cylinders are continuously varied by operation of a variable valve timing mechanism so that the open/close characteristics are made suitable for engine operating conditions, and in which cylinder deactivation control is performed that switches, according to the engine operating conditions, the internal combustion engine between an all cylinder operation, in which all of the cylinders are operated, and a cylinder deactivation operation, in which operation of part of the cylinders is stopped, which the controller switches the variable valve timing mechanism between an operation allowed state and an operation inhibited state while the cylinder deactivation control is performed, wherein an engine operational region in which the cylinder deactivation operation is performed in the cylinder deactivation control is either a first engine operational region or a second engine operational region;

the first engine operational region is determined provided that the open/close characteristics of the engine valve are varied so that the open/close characteristics are made suitable for the engine operating conditions when the variable valve timing mechanism is in the operation allowed state;

the second engine operational region is determined provided that the open/close characteristics of the engine valve are fixed when the variable valve timing mechanism is in the operation inhibited state;

wherein the second engine operational region in which the variable valve timing mechanism is in the operation inhibited state is narrower as compared to the first engine operational region in which the variable valve timing mechanism is in the operation allowed state.

2. The controller for an internal combustion engine according to claim 1, wherein the variable valve timing mechanism varies the open/close characteristics of an intake valve of the internal combustion engine, wherein the engine operational region in which the cylinder deactivation operation is performed in the cylinder deactivation control is determined based on an engine speed and an engine load, and wherein the engine operational region is narrowed in a direction toward an engine low-load side in the second engine operational region in which the variable valve timing mechanism is in the operation inhibited state as compared to the first engine operational region in which the variable valve timing mechanism is in the operation allowed state.

3. The controller for an internal combustion engine according to claim 1, wherein in the cylinder deactivation control, referring to maps each of which defines the engine operational region in which the cylinder deactivation operation is performed, the cylinder deactivation operation is performed when the engine operating conditions fall within the engine operational region, and the all cylinder operation is performed when the engine operating conditions do not fall within the engine operational region, wherein the maps include a first map that is associated with the operation allowed state of the variable valve timing mechanism and a second map that is associated with the operation inhibited state of the variable valve timing mechanism, and wherein, as the map used in the cylinder deactivation control, the first map is selected when the variable valve timing mechanism is in the operation allowed state, and the second map is selected when the variable valve timing mechanism is in the operation inhibited state.

4. The controller for an internal combustion engine according to claim 1,
wherein the variable valve timing mechanism is operated based on an operation command value that is calculated with reference to a map based on the engine operating conditions, and
wherein the map is set so that the operation command value corresponding to the all cylinder operation is calculated in the engine operational region in which the all cylinder operation is performed in the cylinder deactivation control, and the operation command value corresponding to the cylinder deactivation operation is calculated in the engine operational region in which the cylinder deactivation operation is performed in the cylinder deactivation control.

5. A controller for an internal combustion engine that includes a variable valve timing mechanism that continuously varies open/close characteristics of an engine valve of each of cylinders, and in which a cylinder deactivation control is performed that switches, according to engine operating conditions, the internal combustion engine between an all cylinder operation, in which all of the cylinders are operated, and a cylinder deactivation operation, in which operation of part of the cylinders is stopped, which the controller switches the variable valve timing mechanism between an operation allowed state and an operation inhibited state while the cylinder deactivation control is performed,
wherein an engine operational region in which the cylinder deactivation operation is performed in the cylinder deactivation control is changed depending on whether the variable valve timing mechanism is in the operation allowed state or in the operation inhibited state, and
wherein the engine operational region when the variable valve timing mechanism is in the operation inhibited state is narrower as compared to the engine operational region when the variable valve timing mechanism is in the operation allowed state.

6. The controller for an internal combustion engine according to claim 5,
wherein the variable valve timing mechanism varies the open/close characteristics of an intake valve of the internal combustion engine,
wherein the engine operational region in which the cylinder deactivation operation is performed in the cylinder deactivation control is determined based on an engine speed and an engine load, and
wherein the engine operational region is narrowed in a direction toward an engine low-load side when the variable valve timing mechanism is in the operation inhibited state as compared to the engine operational region when the variable valve timing mechanism is in the operation allowed state.

7. The controller for an internal combustion engine according to claim 5,
wherein in the cylinder deactivation control, referring to maps each of which defines the engine operational region in which the cylinder deactivation operation is performed, the cylinder deactivation operation is performed when the engine operating conditions fall within the engine operational region, and the all cylinder operation is performed when the engine operating conditions do not fall within the engine operational region,
wherein the maps include a first map that is associated with the operation allowed state of the variable valve timing mechanism and a second map that is associated with the operation inhibited state of the variable valve timing mechanism, and
wherein, as the map used in the cylinder deactivation control, the first map is selected when the variable valve timing mechanism is in the operation allowed state, and the second map is selected when the variable valve timing mechanism is in the operation inhibited state.

8. The controller for an internal combustion engine according to claim 5,
wherein the variable valve timing mechanism is operated based on an operation command value that is calculated with reference to a map based on the engine operating conditions, and
wherein the map is set so that the operation command value corresponding to the all cylinder operation is calculated in the engine operational region in which the all cylinder operation is performed in the cylinder deactivation control, and the operation command value corresponding to the cylinder deactivation operation is calculated in the engine operational region in which the cylinder deactivation operation is performed in the cylinder deactivation control.

9. A method of controlling an internal combustion engine that includes a variable valve timing mechanism that continuously varies open/close characteristics of an engine valve of each of cylinders, and in which a cylinder deactivation control is performed that switches, according to engine operating conditions, the internal combustion engine between an all cylinder operation, in which all of the cylinders are operated, and a cylinder deactivation operation, in which operation of part of the cylinders is stopped, the method comprising:
switching the variable valve timing mechanism between an operation allowed state and an operation inhibited state while the cylinder deactivation control is performed; and
changing an engine operational region in which the cylinder deactivation operation is performed in the cylinder deactivation control, depending on whether the variable valve timing mechanism is in the operation allowed state or in the operation inhibited state,
wherein the engine operational region when the variable valve timing mechanism is in the operation inhibited state is narrower as compared to the engine operational region when the variable valve timing mechanism is in the operation allowed state.

10. The method of controlling an internal combustion engine according to claim 9, wherein an engine operational region in which the cylinder deactivation operation is performed in the cylinder deactivation control is either a first engine operational region or a second engine operational region;
the first engine operational region is determined provided that the open/close characteristics of the engine valve are varied so that the open/close characteristics are made suitable for the engine operating conditions when the variable valve timing mechanism is in the operation allowed state;
the second engine operational region is determined provided that the open/close characteristics of the engine valve are fixed when the variable valve timing mechanism is in the operation inhibited state.

11. The method of controlling an internal combustion engine according to claim 9,
wherein the variable valve timing mechanism varies the open/close characteristics of an intake valve of the internal combustion engine,
wherein the engine operational region in which the cylinder deactivation operation is performed in the cylinder deactivation control is determined based on an engine speed and an engine load, and wherein the engine operational region is narrowed in a direction toward an engine low-load side when the variable valve timing mechanism is in the operation inhibited state as compared to the engine operational region when the variable valve timing mechanism is in the operation allowed state.

12. The method of controlling an internal combustion engine according to claim 9, wherein in the cylinder deactivation control, referring to maps each of which defines the engine operational region in which the cylinder deactivation operation is performed, the cylinder deactivation operation is performed when the engine operating conditions fall within the engine operational region, and the all cylinder operation is performed when the engine operating conditions do not fall within the engine operational region, wherein the maps include a first map that is associated with the operation allowed state of the variable valve timing mechanism and a second map that is associated with the operation inhibited state of the variable valve timing mechanism, and wherein, as the map used in the cylinder deactivation control, the first map is selected when the variable valve timing mechanism is in the operation allowed state, and the second map is selected when the variable valve timing mechanism is in the operation inhibited state.

13. The method of controlling an internal combustion engine according to claim 9, wherein the variable valve timing mechanism is operated based on an operation command value that is calculated with reference to a map based on the engine operating conditions, and wherein the map is set so that the operation command value corresponding to the all cylinder operation is calculated in the engine operational region in which the all cylinder operation is performed in the cylinder deactivation control, and the operation command value corresponding to the cylinder deactivation operation is calculated in the engine operational region in which the cylinder deactivation operation is performed in the cylinder deactivation control.

* * * * *

UNITED STATES PATENT AND TRADEMARK OFFICE
CERTIFICATE OF CORRECTION

| | |
|---|---|
| PATENT NO. | : 8,025,043 B2 |
| APPLICATION NO. | : 12/367753 |
| DATED | : September 27, 2011 |
| INVENTOR(S) | : Yoshihito Moriya |

It is certified that error appears in the above-identified patent and that said Letters Patent is hereby corrected as shown below:

Column 13, line 2 - delete "8102" and insert --S102--
Column 13, line 26 - delete "liming" and insert --timing--
Column 13, line 61 - delete "liming" and insert --timing--

Signed and Sealed this
Twenty-fourth Day of April, 2012

David J. Kappos
*Director of the United States Patent and Trademark Office*